US009518199B2

(12) United States Patent
Gerst et al.

(10) Patent No.: US 9,518,199 B2
(45) Date of Patent: Dec. 13, 2016

(54) PSA POLYMER OF N-BUTYL ACRYLATE, ETHYL ACRYLATE, VINYL ACETATE, AND ACID MONOMER

(75) Inventors: Matthias Gerst, Maikammer (DE); Gerhard Auchter, Bad Duerkheim (DE); Cornelis Petrus Beyers, Altrip (DE)

(73) Assignee: BASF SE, Ludwigshafen (DE)

( * ) Notice: Subject to any disclaimer, the term of this patent is extended or adjusted under 35 U.S.C. 154(b) by 646 days.

(21) Appl. No.: 13/505,390

(22) PCT Filed: Oct. 28, 2010

(86) PCT No.: PCT/EP2010/066298
§ 371 (c)(1),
(2), (4) Date: May 1, 2012

(87) PCT Pub. No.: WO2011/054719
PCT Pub. Date: May 12, 2011

(65) Prior Publication Data
US 2012/0213992 A1  Aug. 23, 2012

Related U.S. Application Data

(60) Provisional application No. 61/258,234, filed on Nov. 5, 2009.

(51) Int. Cl.
| | | |
|---|---|---|
| *C09J 7/02* | (2006.01) | |
| *C09J 133/00* | (2006.01) | |
| *C09J 133/02* | (2006.01) | |
| *C09J 133/06* | (2006.01) | |
| *C09J 133/08* | (2006.01) | |
| *C09J 131/04* | (2006.01) | |
| *C09J 125/04* | (2006.01) | |

(52) U.S. Cl.
CPC ............ *C09J 133/06* (2013.01); *C09J 131/04* (2013.01); *C09J 133/00* (2013.01); *C09J 133/02* (2013.01); *C09J 133/08* (2013.01); *C09J 7/0217* (2013.01); *C09J 125/04* (2013.01); *C09J 2201/606* (2013.01); *C09J 2203/334* (2013.01); *C09J 2433/00* (2013.01); *Y10T 428/2891* (2015.01)

(58) Field of Classification Search
None
See application file for complete search history.

(56) References Cited

U.S. PATENT DOCUMENTS

| | | | |
|---|---|---|---|
| 4,038,454 A * | 7/1977 | Lehmann et al. | ............ 428/356 |
| 4,185,050 A * | 1/1980 | Lazear et al. | ................. 525/221 |
| 4,316,830 A | 2/1982 | Mallon | |
| 5,057,366 A * | 10/1991 | Husman et al. | ........ 428/355 CN |
| 5,814,685 A * | 9/1998 | Satake et al. | ................. 523/201 |
| 6,107,382 A * | 8/2000 | Williams | .............. C08F 220/12 524/272 |
| 6,214,925 B1 * | 4/2001 | Schuler et al. | ............... 524/556 |
| 6,582,791 B2 | 6/2003 | Peloquin et al. | |
| 6,620,870 B1 * | 9/2003 | Gerst et al. | .................... 524/156 |
| 7,070,051 B2 * | 7/2006 | Kanner et al. | ................. 206/382 |
| 7,763,337 B2 * | 7/2010 | Paiva et al. | .................... 428/41.5 |
| 2003/0118770 A1 * | 6/2003 | Suwa et al. | .................. 428/41.5 |
| 2006/0084735 A1 * | 4/2006 | Takahashi et al. | ............ 524/271 |
| 2009/0250109 A1 * | 10/2009 | Hasegawa | ..................... 136/256 |
| 2010/0055370 A1 | 3/2010 | Diehl et al. | |
| 2011/0014404 A1 | 1/2011 | Beyers et al. | |
| 2011/0024035 A1 | 2/2011 | Koplin et al. | |
| 2011/0033701 A1 | 2/2011 | Gerst et al. | |
| 2011/0226416 A1 | 9/2011 | Gerst et al. | |

FOREIGN PATENT DOCUMENTS

| | | |
|---|---|---|
| DE | 2 008 011 | 10/1970 |
| EP | 0 081 083 | 6/1983 |
| EP | 0 625 557 | 11/1994 |
| EP | 0 952 199 | 10/1999 |
| EP | 2 166 057 | 3/2010 |
| WO | 00 36039 | 6/2000 |
| WO | 2006 082209 | 8/2006 |
| WO | 2009 115473 | 9/2009 |
| WO | 2011 051206 | 5/2011 |
| WO | 2011 051373 | 5/2011 |

OTHER PUBLICATIONS

Aldrich Polymer Data Sheet (2014).*
Chinese Office Action issued May 20, 2013 in Patent Application No. 201080050325.0 (English Translation only).
Zhang Junying et al., "Acrylate Pressure-Sensitive Adhesive", Chemical Industry Press, Material Science and Engineering Publication Center, First Edition, Apr. 2006, with Partial English Translation, 9 pages.
International Search Report Issued Dec. 10, 2010 in PCT/EP10/66298 Filed Oct. 28, 2010.

* cited by examiner

*Primary Examiner* — Frank D Ducheneaux
(74) *Attorney, Agent, or Firm* — Oblon, McClelland, Maier & Neustadt, L.L.P.

(57) ABSTRACT

Described is a pressure-sensitive adhesive (PSA) polymer formed from (i) 50%-95% by weight of n-butyl acrylate, (ii) 1%-20% by weight of ethyl acrylate, (iii) 1%-20% by weight of vinyl acetate, (iv) 0.1%-5% by weight of at least one ethylenically unsaturated acid or ethylenically unsaturated acid anhydride, and (v) 0% to 30% by weight of other ethylenically unsaturated compounds different from the monomers (i) to (iv). The PSA polymer can be used for producing self-adhesive articles, more particularly paper labels or film labels.

8 Claims, No Drawings

PSA POLYMER OF N-BUTYL ACRYLATE, ETHYL ACRYLATE, VINYL ACETATE, AND ACID MONOMER

The invention relates to a pressure-sensitive adhesive (PSA) polymer formed from (i) 50%-95% by weight of n-butyl acrylate, (ii) 1%-20% by weight of ethyl acrylate, (iii) 1%-20% by weight of vinyl acetate, (iv) 0.1%-5% by weight of at least one ethylenically unsaturated acid or ethylenically unsaturated acid anhydride, and (v) 0% to 30% by weight of other ethylenically unsaturated compounds different from the monomers (i) to (iv). The invention also relates to a PSA dispersion comprising the polymer, and to self-adhesive articles produced therewith, more particularly self-adhesive labels.

With pressure-sensitive adhesives (PSAs) there is a desire not only for effective adhesion to the substrate but also for sufficient cohesion (internal strength) within the layer of adhesive. Adhesion and cohesion are divergent performance properties. Measures taken to improve adhesion generally lead at the same time to a deterioration in cohesion, and vice versa.

PSAs based on aqueous polymer dispersions which are obtainable by emulsion polymerization have been known for a long time. They include, more particularly, poly-acrylates. These are generally copolymers, in which at least one of the monomers is an acrylic ester that forms polymers having a relatively low glass transition temperature, an example being n-butyl acrylate. Known acrylate polymers based on n-butyl acrylate do have adequate adhesive properties at room temperature for the production of self-adhesive labels. Owing to the temperature dependence of the surface tack, however, there is a distinct decrease in surface tack at lower temperatures. Consequently there is a desire for PSA polymers which still have good surface tack even at temperatures well below room temperature, particularly with respect to hydrophobic surfaces such as polyethylene, for example.

WO 2006/082209 describes adhesive polymers in which butyl acrylate is a principal monomer and vinyl acetate is excluded. EP 625557 A1 describes dispersion-based PSAs. Example D shows that copolymerization with vinyl acetate leads to reduced adhesive properties. EP 952199 describes PSAs constructed from monomers including butyl acrylate, copolymerized with ethyl acrylate (examples 7 and 11). WO 00/36039 describes label adhesives. Comparative examples 1-4 are produced from monomers including butyl acrylate and vinyl acetate. Copolymers of butyl acrylate and vinyl acetate are also known from DE 2008011 (table 1). U.S. Pat. No. 4,316,830 describes PSA dispersions. The adhesive polymers may be formed, for example, either from n-butyl acrylate, vinyl acetate, and acrylic acid (example 4) or from n-butyl acrylate, ethyl acrylate, and acrylic acid (example 5).

It was an object of the present invention to provide a pressure-sensitive adhesive, more particularly for use for producing labels having improved surface tack at low temperatures with respect to nonpolar surfaces.

Found accordingly have been the PSA polymers elucidated in more detail below, and the self-adhesive articles obtainable through their use. A PSA is a viscoelastic adhesive whose set film at room temperature (20° C.) in the dry state remains permanently tacky and adhesive. Adhesion to substrates is accomplished instantaneously under gentle pressure. The invention provides a pressure-sensitive adhesive polymer formed from (i) 50%-95% by weight of n-butyl acrylate,
(ii) 1%-20% by weight of ethyl acrylate,
(iii) 1%-20% by weight of vinyl acetate,
(iv) 0.1%-5% by weight of at least one ethylenically unsaturated acid or ethylenically unsaturated acid anhydride, and
(v) 0% to 30% by weight of other ethylenically unsaturated compounds different from the monomers (i) to (iv).

The percentages by weight relate in each case to the sum of all of the monomers used in the polymerization.

The principal monomer is n-butyl acrylate, which is used in an amount of 50%-95%, preferably of 60%-90% or of 70%-90%, by weight. Ethyl acrylate is used in an amount of 1%-20% by weight, preferably of 2%-10% by weight. The weight amount ratio of n-butyl acrylate to ethyl acrylate is preferably from 2:1 to 30:1, more particularly from 5:1 to 20:1. Vinyl acetate is used in an amount of 1%-20% by weight, preferably of 2%-10% by weight. The weight amount ratio of n-butyl acrylate to vinyl acetate is preferably from 2:1 to 30:1, more particularly from 5:1 to 20:1.

Ethylenically unsaturated acids or ethylenically unsaturated acid anhydrides (acid monomers) are used in an amount of 0.1%-5% by weight, preferably of 0.2%-3% by weight. Suitability is possessed for example by monomers having carboxylic, sulfonic or phosphonic acid groups. Carboxylic acid groups are preferred. Examples include acrylic acid, methacrylic acid, itaconic acid, maleic acid, and fumaric acid. The acid groups may be in the form of their salts. Acrylic acid and methacrylic acid are particularly preferred.

The adhesive polymer may be constructed of further monomers. The other monomers (v), which are different from the monomers (i) to (iv), are copolymerizable, ethylenically unsaturated compounds. They can be used in amounts of 0% to 30% by weight, preferably of 1%-20% by weight. The other monomers (v) are preferably selected from the group consisting of $C_1$-$C_{20}$ alkyl (meth)acrylates other than n-butyl acrylate and ethyl acrylate, vinyl esters of carboxylic acids comprising up to 20 C atoms, other than vinyl acetate, vinylaromatics having up to 20 C atoms, ethylenically unsaturated nitriles, vinyl halides, vinyl ethers of alcohols comprising 1 to 10 C atoms, aliphatic hydrocarbons having 2 to 8 C atoms and one or two double bonds, monomers comprising hydroxyl groups, more particularly $C_1$-$C_{10}$ hydroxyalkyl (meth)acrylates, (meth)acrylamide or mixtures of these monomers. Other monomers that may additionally be cited include phenyloxyethylglycol mono (meth)acrylate, glycidyl (meth)acrylate, aminoalkyl (meth) acrylates such as, for example, 2-aminoethyl (meth)acrylate. Alkyl groups have preferably from 1 to 20 C atoms. $C_1$-$C_{20}$-Alkyl (meth)acrylates have 1-20 C atoms in the alkyl groups. $C_1$-$C_{10}$-Hydroxyalkyl (meth)acrylates have 1-10 C atoms in the hydroxy-alkyl groups. As other monomers, mention may also be made of crosslinking monomers.

Suitable monomers are, for example, (meth)acrylic acid alkyl esters with a $C_1$-$C_{10}$ alkyl radical, such as methyl methacrylate, methyl acrylate, and 2-ethylhexyl acrylate. Also suitable more particularly are mixtures of the (meth) acrylic acid alkyl esters. Vinyl esters of carboxylic acids having 1 to 20 C atoms are, for example, vinyl laurate, vinyl stearate, vinyl propionate, and versatic acid vinyl esters. Vinylaromatic compounds contemplated include vinyltoluene, a- and p-methylstyrene, a-butylstyrene, 4-n-butylstyrene, 4-n-decylstyrene, and—preferably—styrene. Examples of nitriles are acrylonitrile and methacrylonitrile. The vinyl halides are ethylenically unsaturated compounds substituted by chlorine, fluorine or bromine, preferably vinyl chloride and vinylidene chloride. Examples of vinyl ethers include vinyl methyl ether and vinyl isobutyl ether. Vinyl ethers of alcohols comprising 1 to 4 C atoms are preferred.

Suitable hydrocarbons having 4 to 8 C atoms and two olefinic double bonds are, for example, butadiene, isoprene and chloroprene.

Preferred other monomers (v) are $C_1$ to $C_{10}$ alkyl acrylates and $C_1$ to $C_{10}$ alkyl methacrylates, more particularly $C_1$ to $C_8$ alkyl acrylates and methacrylates, and vinylaromatics, more particularly styrene, and mixtures thereof, and also C2 to C10 hydroxyalkyl (meth)acrylates. Especially preferred are methyl acrylate, methyl methacrylate, n-hexyl acrylate, octyl acrylate, and 2-ethylhexyl acrylate, styrene and hydroxypropyl acrylate, and mixtures of these monomers.

The other monomers are used generally in minor amounts. Their proportion in total is preferably below 20% by weight, more particularly below 10% by weight.

In one embodiment the pressure-sensitive adhesive polymer is formed from
(i) 70%-90% by weight of n-butyl acrylate,
(ii) 2%-10% by weight of ethyl acrylate,
(iii) 2%-10% by weight of vinyl acetate,
(iv) 0.2%-3% by weight of at least one ethylenically unsaturated acid or ethylenically unsaturated acid anhydride, and
(v) 1% to 20% by weight of other ethylenically unsaturated compounds different from the monomers (i) to (iv).

In one embodiment the pressure-sensitive adhesive polymer is formed from
(i) 70%-90% by weight of n-butyl acrylate,
(ii) 2%-10% by weight of ethyl acrylate,
(iii) 2%-10% by weight of vinyl acetate,
(iv) 0.2%-3% by weight of at least one ethylenically unsaturated acid selected from acrylic acid and methacrylic acid, and
(v) styrene and hydroxypropyl acrylate in an amount of, together, 1%-20% by weight.

The adhesive polymers of the invention are obtainable by free-radical polymerization of ethylenically unsaturated compounds (monomers). The polymers are prepared preferably by emulsion polymerization and are therefore preferably emulsion polymers. The invention, accordingly, also provides pressure-sensitive adhesive dispersions comprising an aqueously dispersed pressure-sensitive adhesive polymer of the invention which has been prepared by emulsion polymerization.

In the emulsion polymerization, ethylenically unsaturated compounds (monomers) are polymerized in water, with ionic and/or nonionic emulsifiers and/or protective colloids or stabilizers being used as surface-active compounds for stabilizing the monomer droplets and the polymer particles subsequently formed from the monomers. The surface-active substances are used typically in amounts of 0.1 to 10 parts by weight, preferably 0.2 to 5 parts by weight, per 100 parts by weight of the monomers to be polymerized.

A comprehensive description of suitable protective colloids is found in Houben-Weyl, Methoden der organischen Chemie, volume XIV/1, Makromolekulare Stoffe [Macromolecular compounds], Georg-Thieme-Verlag, Stuttgart, 1961, pp. 411 to 420. Emulsifiers contemplated include anionic, cationic, and nonionic emulsifiers. As surface-active substances it is preferred to use emulsifiers, whose molecular weights, in contradistinction to the protective colloids, are typically below 2000 g/mol. Where mixtures of surface-active substances are used, the individual components must of course be compatible with one another, something which in case of doubt can be ascertained by means of a few preliminary tests. Preference is given to using anionic and nonionic emulsifiers as surface-active substances. Customary accompanying emulsifiers are, for example, ethoxylated fatty alcohols (EO degree: 3 to 50, alkyl radical: $C_8$- to $C_{36}$), ethoxylated mono-, di-, and trialkylphenols (EO degree: 3 to 50, alkyl radical: $C_4$- to $C_9$), alkali metal salts of dialkyl esters of sulfosuccinic acid, and also alkali metal salts and ammonium salts of alkyl sulfates (alkyl radical: $C_8$- to $C_{12}$), of ethoxylated alkanols (EO degree: 4 to 30, alkyl radical: $C_{12}$- to $C_{18}$), of ethoxylated alkylphenols (EO degree: 3 to 50, alkyl radical: $C_4$- to $C_9$), of alkylsulfonic acids (alkyl radical: $C_{12}$- to $C_{18}$), and of alkylaryl-sulfonic acids (alkyl radical: $C_9$- to $C_{18}$).

Other suitable emulsifiers are compounds of the general formula

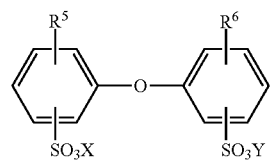

in which R5 and R6 are hydrogen or C4 to C14 alkyl and are not simultaneously hydrogen, and X and Y may be alkali metal ions and/or ammonium ions. Preferably R5, R6 are linear or branched alkyl radicals having 6 to 18 C atoms or hydrogen, and in particular having 6, 12, and 16 C atoms, with R5 and R6 not both simultaneously being hydrogen. X and Y are preferably sodium, potassium or ammonium ions, with sodium being particularly preferred. Particularly advantageous compounds are those in which X and Y are sodium, R5 is a branched alkyl radical having 12 C atoms, and R6 is hydrogen or R5. Use is frequently made of technical mixtures which have a fraction of 50% to 90% by weight of the monoalkylated product. Commercial products of suitable emulsifiers are, for example, Dowfax® 2 A1, Emulan® NP 50, Dextrol® OC 50, Emulgator 825, Emulgator 825 S, Emulan® OG, Texapon® NSO, Nekanil® 904 S, Lumiten® I-RA, Lumiten E 3065, Disponil® FES 77, Lutensol® AT 18, Steinapol® VSL, Emulphor® NPS 25. For the present invention, ionic emulsifiers or protective colloids are preferred. Particular preference is given to ionic emulsifiers, especially salts and acids, such as carboxylic acids, sulfonic acids, and sulfates, sulfonates or carboxylates. In particular it is also possible to use mixtures of ionic and nonionic emulsifiers.

The emulsion polymerization can be triggered using water-soluble initiators. Water-soluble initiators are, for example, ammonium salts and alkali metal salts of peroxodisulfuric acid, e.g., sodium peroxodisulfate, hydrogen peroxide or organic peroxides, e.g., tert-butyl hydroperoxide. Also suitable as initiator are what are called reduction-oxidation (redox) initiator systems. The redox initiator systems are composed of at least one, usually inorganic reducing agent and one organic or inorganic oxidizing agent. The oxidizing component comprises, for example, the initiators already identified above for the emulsion polymerization. The reducing components are, for example, alkali metal salts of sulfurous acid, such as sodium sulfite, sodium hydrogen sulfite, alkali metal salts of disulfurous acid such as sodium disulfite, bisulfite addition compounds of aliphatic aldehydes and ketones, such as acetone bisulfite or reducing agents such as hydroxymethanesulfinic acid and salts thereof, or ascorbic acid. The redox initiator systems can be used in the company of soluble metal compounds whose metallic component is able to occur in a plurality of valence states. Typical redox initiator systems are, for example, ascorbic acid/iron(II) sulfate/sodium peroxydisulfate, tert-butyl hydroperoxide/sodium disulfite, tert-butyl hydroperoxide/Na-hydroxymethanesulfinic acid. The individual components, the reducing component, for example, may also be mixtures, an example being a mixture of the sodium salt of hydroxymethanesulfinic acid with sodium disulfite.

The stated initiators are used usually in the form of aqueous solutions, with the lower concentration being determined by the amount of water that is acceptable in the dispersion, and the upper concentration by the solubility of the respective compound in water. Generally speaking, the concentration of the initiators is 0.1% to 30%, preferably 0.5% to 20%, more preferably 1.0% to 10%, by weight, based on the monomers to be polymerized. It is also possible for two or more different initiators to be used for the emulsion polymerization.

In the course of the polymerization it is possible to use molecular weight regulators, in amounts, for example, of 0.1 to 0.8 part by weight, based on 100 parts by weight of the monomers to be polymerized. Through the use of such regulators, by means of a chain termination reaction, it is possible to lower the molar mass of the emulsion polymer. In this procedure, the regulators are attached to the polymer, generally to the chain end. The amount of the regulators is more particularly 0.05 to 4 parts by weight, more preferably 0.05 to 0.8 part by weight, and very preferably 0.1 to 0.6 part by weight, based on 100 parts by weight of the monomers to be polymerized. Suitable regulators are, for example, compounds having a thiol group such as tert-butyl mercaptan, thioglycolic acid ethylacrylic esters, mercaptoethanol, mercaptopropyltrimethoxysilane or tert-dodecyl mercaptan. The regulators are, generally speaking, low-molecular-weight compounds, with a molar weight of less than 2000, more particularly less than 1000 g/mol.

The emulsion polymerization takes place in general at 30 to 130° C., preferably at 50 to 90° C. The polymerization medium may be composed either just of water or else of mixtures of water and water-miscible liquids such as methanol. It is preferred to use just water. The emulsion polymerization may be conducted either as a batch operation or in the form of a feed process, including staged or gradient procedures. Preference is given to the feed process, in which a portion of the polymerization batch is included in the initial charge, heating takes place to the polymerization temperature, polymerization is commenced, and then the remainder of the polymerization batch, typically via two or more spatially separate feed streams, of which one or more comprise the monomers in pure form or in emulsified form, is supplied to the polymerization zone continuously, in stages, or subject to a concentration gradient, while the polymerization is maintained. In the polymerization it is also possible to include in the initial charge a polymer seed for the purpose, for example, of setting the particle size more effectively.

The manner in which the initiator is added to the polymerization vessel in the course of the free-radical aqueous emulsion polymerization is known to a person of ordinary skill in the art. It may either be included in its entirety in the initial charge to the polymerization vessel, or else employed, continuously or in stages, at the rate at which it is consumed in the course of the free-radical aqueous emulsion polymerization. In each specific case this will depend both on the chemical nature of the initiator system and on the polymerization temperature. It is preferred to include part in the initial charge and to supply the remainder to the polymerization zone in accordance with the rate of its consumption.

To remove the residual monomers, it is also customary to add initiator after the end of the emulsion polymerization proper, i.e., after a monomer conversion of at least 95%. In the feed process, the individual components can be added to the reactor from above, in the side, or from below, through the reactor base.

In the emulsion polymerization, aqueous polymer dispersions generally with solids contents of 15% to 75%, preferably of 40% to 75%, by weight are obtained. For a high space/time yield of the reactor, dispersions having a very high solids content are preferred. In order to be able to attain solids contents >60% by weight, a bimodal or polymodal particle size ought to be set, since otherwise the viscosity becomes too high, and the dispersion can no longer be managed. Producing a new generation of particles can be done, for example, by adding seed (EP 81083), by adding excess amounts of emulsifier, or by adding miniemulsions. A further advantage associated with the combination of low viscosity at high solids content is the improved coating behavior at high solids contents. Producing one or more new particle generations can be done at any desired point in time. Said point in time is guided by the particle size distribution that is aimed at for a low viscosity.

The polymer prepared in this way is used preferably in the form of its aqueous dispersion. The size distribution of the dispersion particles may monomodal, bimodal or multimodal. In the case of monomodal particle size distribution, the average size of the polymer particles dispersed in the aqueous dispersion is preferably less than 400 nm, more particularly less than 200 nm. With particular preference the average particle size is between 140 and 200 nm. The average particle size here is the $d_{50}$ of the particle size distribution, i.e., 50% by weight of the total mass of all particles have a particle diameter smaller than the $d_{50}$. The particle size distribution can be determined in a known way using the analytical ultracentrifuge (W. Mächtle, Makromolekulare Chemie 185 (1984), page 1025-1039). In the case of bimodal or multimodal particle size distribution, the particle size may be up to 1000 nm. The pH of the polymer dispersion is set preferably at a pH of more than 4.5, more particularly at a pH of between 5 and 8. The glass transition temperature of the PSA polymer is preferably less than 0° C., more preferably −60 to −10° C., and very preferably −60 to −20° C. The glass transition temperature can be determined in accordance with customary methods such as differential thermal analysis or differential scanning calorimetry (see, for example, ASTM 3418/82, "midpoint temperature").

A pressure-sensitive adhesive of the invention comprises the PSA polymers preferably in the form of the aqueous polymer dispersion as obtained or obtainable by the emulsion polymerization. The PSAs may be composed solely of the polymers or of the aqueous dispersion of polymers. Alternatively, the PSA may also comprise other adjuvants, examples being fillers, dyes, flow control agents, thickeners, preferably associative thickeners, defoamers, plasticizers, pigments, wetting agents or tackifiers (tackifying resins). Tackifiers are known, for example, from Adhesive Age, July 1987, pages 19-23 or Polym. Mater. Sci. Eng. 61 (1989), pages 588-592. For improved surface wetting, the PSAs may comprise, in particular, wetting assistants, examples being fatty alcohol ethoxylates, alkylphenol ethoxylates, nonylphenol ethoxylates, polyoxyethylenes/propylenes or sodium dodecylsulfonates. The amount of adjuvants is generally 0.05 to 5 parts by weight, more particularly 0.1 to 3 parts by weight, per 100 parts by weight of polymer (solid).

Tackifiers are, for example, natural resins, such as rosins and their derivatives formed by disproportionation or isomerization, polymerization, dimerization or hydrogenation. They may be present in their salt form (with, for example, monovalent or polyvalent counterions (cations) or, preferably, in their esterified form. Alcohols used for the esterification may be monohydric or polyhydric. Examples are methanol, ethanediol, diethylene glycol, triethylene glycol, 1,2,3-propanethiol, and pentaerythritol. Also used, furthermore, are hydrocarbon resins, examples being coumarone-indene resins, polyterpene resins, hydrocarbon resins based on unsaturated CH compounds, such as butadiene, pentene, methylbutene, isoprene, piperylene, divinylmethane, pentadiene, cyclopentene, cyclopentadiene, cyclohexadiene, styrene, a-methylstyrene, and vinyltoluene. Also in increasing use as tackifiers are polyacrylates which have a low molar weight. Preferably these polyacrylates have a weight-average molecular weight $M_w$ of below 30 000. The polyacrylates are preferably composed to an extent of at least 60%, more particularly at least 80%, by weight of $C_1$-$C_8$ alkyl (meth)acrylates. Preferred tackifiers are natural or chemically modified rosins. Rosins are composed predominantly of abietic acid or derivatives of abietic acid. The tackifiers can be added to the polymer dispersion in a simple way. Preferably the tackifiers are themselves in the form of an aqueous dispersion. The amount by weight of the tackifiers is preferably 5 to 100 parts by weight, more preferably 10 to 50 parts by weight, based on 100 parts by weight of polymer (solid/solid).

The PSA polymer or PSA dispersion of the invention can be used for producing self-adhesive articles. The articles are at least partly coated with the PSA. The self-adhesive articles are preferably removable again after bonding. The self-adhesive articles may be, for example, sheets, tapes or labels. Suitable carrier materials are, for example, paper, polymeric films, and metal foils. Self-adhesive tapes of the invention may be single-sidedly or double-sidedly coated tapes made from the above substances. They are more preferably self-adhesive labels. Self-adhesive labels of the invention may be labels of paper or of a thermoplastic film. Thermoplastic films contemplated include, for example, films of polyolefins (e.g., polyethylene, polypropylene), polyolefin copolymers, films of polyesters (e.g., polyethylene terephthalate), or polyacetate. The surfaces of the thermoplastic polymer films are preferably corona-treated. The labels are coated on one side with adhesive. Preferred substrates for the self-adhesive articles are paper and polymer films. Particularly preferred self-adhesive articles are paper labels.

The self-adhesive articles are coated at least partly on at least one surface with a pressure-sensitive adhesive of the invention. The adhesive may be applied by typical methods such as rolling, knife coating or spreading onto the articles. The coat weight is preferably 0.1 to 30 g, more preferably 2 to 20 g, of solid per $m^2$. Application is generally followed by a drying step for removing the water and/or the solvents. The water can be removed by drying at, for example, 50 to 150° C. The coated substrates obtained in this way are used, for example, as self-adhesive articles, such as labels, adhesive tapes or sheets. For this purpose, before or after the application of the adhesive, the carriers can be slit to form adhesive tapes, labels or sheets. For later use, the PSA-coated side of the substrates may be lined with a release paper—with a siliconized paper, for example.

The substrates to which the self-adhesive articles may advantageously be applied may be composed, for example, of metal, wood, glass, paper or plastic. The self-adhesive articles are suitable more particularly for bonding to packaging surfaces, boxes, plastic packaging, books, windows, motor vehicle bodies or bodywork parts.

One embodiment of the invention is a self-adhesive paper label. The carrier material is paper and has a first surface and a second surface, the first surface being self-adhesive and being coated at least partly with a PSA of the invention, and the second surface being printed, possibly, or the second surface, or the label, being at least partly colored, possibly. The coloring may have been brought about, for example, by a colored coating with pigments or dyes, by colored printing, or, in thermal papers, by exposure to heat.

The self-adhesive articles of the invention have very good adhesive properties, especially a good surface tack to non-polar surfaces such as, for example, polyethylene at low temperatures (e.g. 5° C.).

EXAMPLES

The abbreviations used are as follows:
BA: n-butyl acrylate
VAc: vinyl acetate
EA: ethyl acrylate
EHA: 2-ethylhexyl acrylate
S: styrene
HPA: hydroxypropyl acrylate
AA: acrylic acid
Emulsion polymers are used that are prepared from the monomers specified in table 1. The amounts data are parts by weight. Examples C1 and C2 are comparative examples.

TABLE 1

| Example | BA | VAc | EA | EHA | S | MPA | AA |
| --- | --- | --- | --- | --- | --- | --- | --- |
| C1 | 85.25 | 10 | 0 | 0 | 2 | 2 | 0.75 |
| C2 | 85.25 | 0 | 10 | 0 | 2 | 2 | 0.75 |
| I1 | 85.25 | 5 | 5 | 0 | 2 | 2 | 0.75 |
| I2 | 75.25 | 5 | 5 | 10 | 2 | 2 | 0.75 |
| I3 | 75.25 | 7 | 7 | 10 | 0 | 0 | 0.75 |
| I4 | 65.25 | 5 | 5 | 20 | 2 | 2 | 0.75 |
| I5 | 55.25 | 5 | 5 | 30 | 2 | 2 | 0.75 |

Performance Testing

The PSAs were coated at a coat weight of 18 g/$m^2$ onto label paper (Herma, 75 g/$m^2$, unprimed) as carrier (by the transfer method, coating initially of silicone paper, and transfer to paper) and dried at 90° C. for 3 minutes. Thereafter, determinations were made of the peel strength (adhesion), the shear strength (cohesion), and the Quickstick at 23° C. Quickstick was determined additionally at +5° C. on polyethylene.

The PSA-coated carrier was slit into test strips 25 mm wide. To determine the shear strength, the test strips were adhered to steel with an adhered area of 25×25 mm, rolled down once with a roller weighing 1 kg, stored for 10 minutes (under standard conditions, 50% relative humidity, 1 bar, 23° C.), and then loaded in suspension with a 1 kg weight (under standard conditions). The measure of the shear strength was the time taken, in hours, for the weight to fall off; in each case the average was calculated from 5 measurements.

For the determination of the peel strength (adhesion), one 25 mm wide test strip was adhered to a test body made of steel or of polyethylene in each case, and was rolled down once with a roller weighing 1 kg. The test strip was then clamped by one end into the upper jaws of a tensile strain testing apparatus. The adhesive strip was peeled from the test surface at an angle of 180° and at 300 mm/min—that is, the strip of adhesive was bent around and pulled off parallel to the test body, and the expenditure of force required to achieve this was recorded. The measure of the peel strength was the force in N/25 mm which was obtained as the average value from five measurements. The peel strength was determined 24 hours after bonding. After this time, the bond strength has developed fully. The test methods correspond substantially to Finat Test Methods (FTM) 1 and 8. The results are set out in Table 2.

For the determination of the Quickstick (surface tack), the force is determined with which an adhesive, applied to a carrier material without pressure, by bonding to a substrate, opposes its removal from the substrate at a defined removal speed. The carrier material is 75 g/m² label paper; the substrate is polyethylene. A test strip with a width of 25 mm and a length of 250 mm is slit from the adhesive-coated carrier and stored under standard conditions (23° C., 50% relative humidity) for 16 hours. The two ends of the test strip are folded around to a length of approximately 1 cm, with the adhesive side facing inward. From the adhesive strip, a loop is formed with the adhesive side facing outward, and the two ends are brought together and clamped into the upper jaws of a tensile testing machine. The test substrate mount is clamped into the lower jaws, and the test substrate is inserted. The adhesive strip loop is moved downward by the tensile testing machine at a speed of 300 mm/minute, so that the adhesive side of the test strip bonds to the substrate without additional pressure. The tensile testing machine is halted and immediately moved upward again when the lower edge of the upper jaws is located 40 mm above the substrate. The test result is reported in N/25 mm width. The maximum value on the display is read off as a measure of the surface tack. An average is formed from at least 3 individual results. The results are set out in table 3.

TABLE 2

Test results for peel strength and shear strength

| Example | Peel strength on steel [N/25 mm] | Peel strength on PE [N/25 mm] | Shear strength on steel [h] |
| --- | --- | --- | --- |
| C1 | 24.5 | 25.0 | 2.0 |
| C2 | 22.1 | 23.2 | 2.5 |
| I1 | 27.6 | 27.3 | 2.8 |
| I2 | 25.5 | 27.4 | 3.2 |
| I3 | 19.3 | 21.6 | 6.3 |
| I4 | 20.1 | 21.1 | 5.1 |
| I5 | 23.8 | 22.1 | 3.1 |

TABLE 3

Test results for Quickstick

| Example | Quickstick on steel 23° C. [N/25 mm] | Quickstick on PE 23° C. [N/25 mm] | Quickstick onf PE 5° C. [N/25 mm] |
| --- | --- | --- | --- |
| C1 | 15.0 | 10.3 | 2.5 |
| C2 | 10.5 | 8.8 | 3.3 |
| I1 | 18.6 | 13.4 | 6.1 |
| I2 | 18.0 | 13.1 | 8.3 |
| I3 | 15.4 | 12.7 | 8.7 |
| I4 | 15.9 | 12.5 | 8.2 |
| I5 | 13.9 | 12.8 | 7.9 |

Inventive examples I1 to I5 show significantly increased values for Quickstick on polyethylene at 5° C.

The invention claimed is:

1. A pressure-sensitive adhesive polymer, comprising in a polymerized form:
   (i) from 55.25% to 85.25% by weight of n-butyl acrylate,
   (ii) from 5% to 7% by weight of ethyl acrylate,
   (iii) from 5% to 7% by weight of vinyl acetate,
   (iv) 0.2-3% by weight of (meth)acrylic acid, and
   (v) 4% to 34% by weight of at least one monomer selected from the group consisting of 2-ethyl hexyl acrylate, styrene, and hydroxypropyl acrylate,
   wherein the pressure-sensitive adhesive polymer exhibits a quickstick value of from 6.1 N/25 mm to 8.7 N/25 mm at 5° C. when applied to paper and bonded to polyethylene.

2. A pressure-sensitive adhesive dispersion, comprising an aqueously dispersed pressure-sensitive adhesive polymer according to claim 1, which is prepared by emulsion polymerization.

3. A self-adhesive article obtained by coating a carrier material with the pressure-sensitive adhesive polymer according to claim 1.

4. A self-adhesive label, comprising the self-adhesive article according to claim 3.

5. A self-adhesive paper label or film label, comprising the self-adhesive article according to claim 3.

6. A self-adhesive article obtained by coating a carrier material with the pressure-sensitive adhesive dispersion according to claim 2.

7. A self-adhesive label, comprising the self-adhesive article according to claim 6.

8. A self-adhesive paper label or film label, comprising the self-adhesive article according to claim 6.

* * * * *